United States Patent [19]

Fushiya et al.

[11] Patent Number: 4,851,730
[45] Date of Patent: Jul. 25, 1989

[54] BRUSH HOLDER ASSEMBLY FOR ELECTRIC MOTOR

[75] Inventors: Fusao Fushiya; Kenji Yoshida; Akira Naitoh, all of Anjo, Japan

[73] Assignee: Makita Electric Works, Ltd., Anjo, Japan

[21] Appl. No.: 136,287

[22] Filed: Dec. 22, 1987

[30] Foreign Application Priority Data

Dec. 29, 1986 [JP] Japan .................. 61-312439

[51] Int. Cl.[4] .................................. H02K 5/14
[52] U.S. Cl. .................................. 310/249; 310/239; 310/242; 310/71; 439/223
[58] Field of Search .................. 310/40 R, 46, 47, 50, 310/71, 238, 239, 249, 242; 439/223

[56] References Cited

U.S. PATENT DOCUMENTS

| | | | |
|---|---|---|---|
| 3,924,147 | 12/1975 | Tarnow et al. | 310/68 |
| 3,979,615 | 9/1976 | Neff | 310/71 |
| 4,038,573 | 7/1977 | Hillyer et al. | 310/71 |
| 4,056,749 | 11/1977 | Carlson, Jr. et al. | 310/239 |
| 4,071,793 | 1/1978 | Cox | 310/71 |
| 4,370,579 | 1/1983 | Kobayashi et al. | 310/239 |
| 4,523,116 | 6/1985 | Dibbern, Jr. et al. | 310/71 |
| 4,574,215 | 3/1986 | Mabuchi | 310/242 |
| 4,593,220 | 6/1986 | Cousins et al. | 310/239 |
| 4,673,837 | 6/1987 | Gingerich et al. | 310/239 |
| 4,746,298 | 5/1988 | Hollander | 439/223 |

FOREIGN PATENT DOCUMENTS 2075276 11/1981 United Kingdom ............... 310/242

*Primary Examiner*—Patrick R. Salce
*Assistant Examiner*—Judson H. Jones
*Attorney, Agent, or Firm*—Dennison, Meserole, Pollack & Scheiner

[57] ABSTRACT

A brush holder assembly for a commutator type electric motor includes a substantially circular base plate of insulating material having a central aperture for receiving the motor commutator. The base plate includes a pair of brush holders for supporting brushes in operative relation to the commutator. A pair of conductive members are embedded in the base plate. Each conductive member has a brush holder mounting portion exposed on both sides of the base plate and a connecting terminal for electrical connection to the corresponding terminal of the stator coils. Power connecting means is provided on the base plate for electrically connecting the terminals of the stator coils to an electrical power source.

6 Claims, 10 Drawing Sheets

BRUSH HOLDER ASSEMBLY FOR ELECTRIC MOTOR

BACKGROUND OF THE INVENTION

1. Field of the Invention

The present invention relates to the field of commutator type electric motors for power tools, and more particularly to a brush holder assembly for such electric motors which carries a pair of brush holders for slidably supporting brushes for supplying electric power to the rotor coils, and a plurality of terminals for supplying electric power to the stator coils.

2. Description of the Prior Art

In general, the component parts for commutator type electric motors are interconnected with the use of electric leads and crimp terminals. The leads have to be connected to the terminals by hand. This may led to reduced efficiency of operation and increased manufacturing costs.

In addition, during assembly of electric motors, the electric leads can sometimes be caught in the tool housing causing a position of the outer insulating jacket to be removed from the wire. Further, the electric leads can sometimes contact other component parts such as a rotor and a fan thereby resulting in insulation failures and current leaks.

SUMMARY OF THE INVENTION

It is, accordingly, an object of the present invention to provide a novel brush holder assembly for commutator type electric motors which eliminates the need for electric leads for interconnection in the electric motors, thereby reducing the number of component parts and assembly steps for economical manufacture of the electric motors.

It is another object of the present invention to provide such a brush holder assembly which assures the electrical connection during assembly of the electric motors, and which enhances operating reliability.

To achieve the objects and in accordance with the purpose of the present invention, a brush holder assembly is provided fcor a communtator type electric motor including a stator having a pair of stator coils, a terminal mounting board of insulating material disposed on one end of the stator and having a plurality of terminals connected to the stator coils, a stator having rotor coils, and a commutator connected to the rotor coils. The brush holder assembly comprises a substantially circular base plate of insulating material having a central aperture for receiving the commutator; a pair of brush holders mounted on the base plate and each slidably supporting a brush in operative relation to the commutator; a pair of conductive members embedded in the base plate an each having a brush holder mounting portion exposed on both sides of the base plate and a connecting terminal for electrical connection to the corresponding terminal of the terminal mounting board; and power connecting means mounted on the base plate for electrically connecting the terminals of the terminal mounting board to an electrical power source.

The present invention will become more fully apparent from the claims and description as it proceeds in connection with the drawings.

DETAILED DESCRIPTION OF THE PREFERRED EMBODIMENTS

Figure 1:
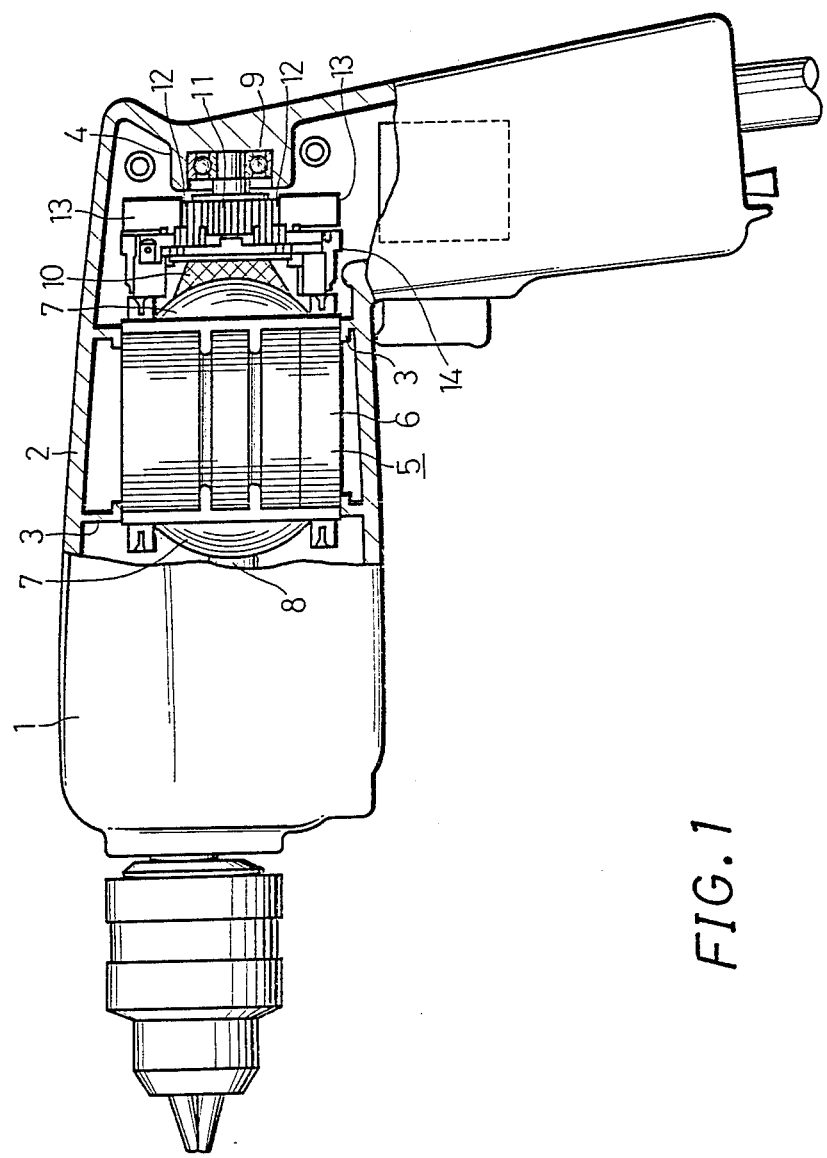
FIG. 1 is a side view, partly in section, of an electric drill incorporating a first embodiment of the present invention.

Referring to the drawings and to FIG. 1 in particular, shown therein and generally designated by the reference numeral 1, is a hand-held tool, namely, an electric drill. As shown therein, the drill 1 includes a housing 2 having inner ribs 3 and a rear bearing boss 4. A commutator type electric motor 5 is held in the housing 2 and includes a stator 6 supported between the inner ribs 3. The stator 6 is provided with a pair of stator coils 7.

A shaft 8 is coaxially mounted in the interior of the stator 6, being journaled in a bearing 9 in the rear bearing boss 4 of the housing 2. A rotor is mounted on the shaft 8, which rotor is located in the interior of the stator 6 and is not visible in FIG. 1. A plurality of rotor coils 10 are mounted on the rotor. a commutator 11, which forms a part of a conventional electric circuit for supplying electric current to the rotor coils 10, is mounted on the shaft 8, and pair of commutator brushes 12 are in contact with the commutator 11 in a conventional manner. The brushes 12 are slidably carried in a pair of brush holders 13 constructed of a conductive material. The brush holders 13 are part of a brush holder assembly 14 which is the subject of the present invention.

Figure 2:
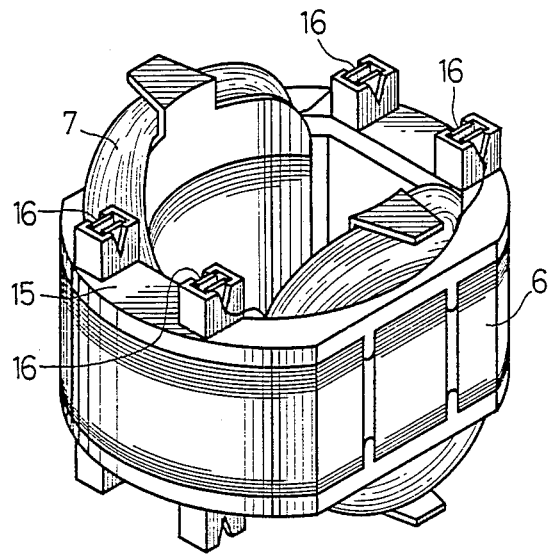
FIG. 2 is a perspective view of the stator shown in FIG. 1.

As shown in FIG. 2, the stator 6 has, on one end face thereof, a terminal mounting board 15 of insulating material serving as an insulating frame for the stator coils 7 and also adapted to prevent deformation of the stator coils 7. The terminal mounting board 15 is provided with female terminals 16 connected with respective ends of the stator coils 7.

The brush holder assembly 14 of the present invention will now be explained in detail with reference to FIGS. 3 to 23.

Figure 3:
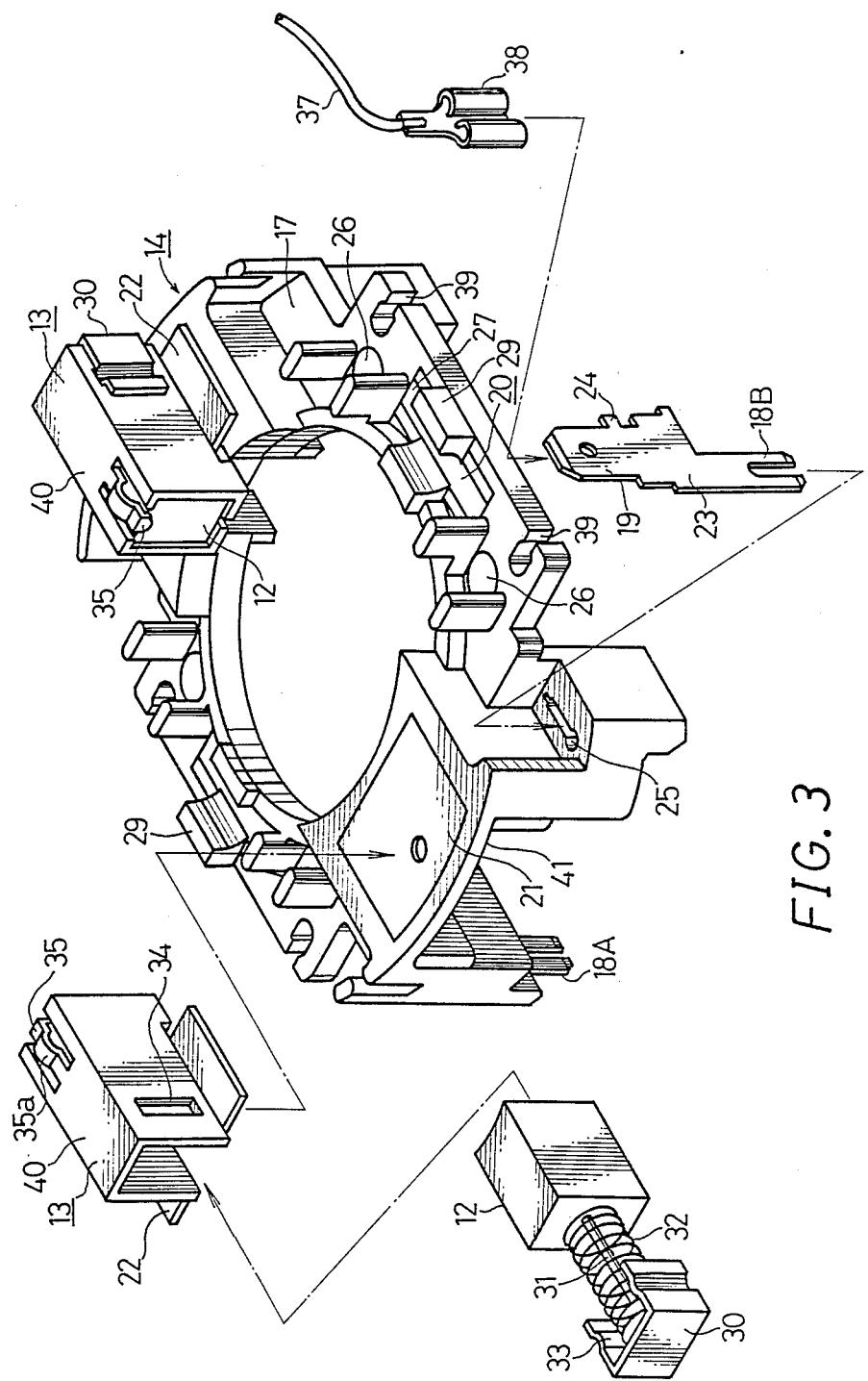
FIG. 3 is a perspective view of the brush holder assembly according to the first embodiment of the present invention.
Figure 4:
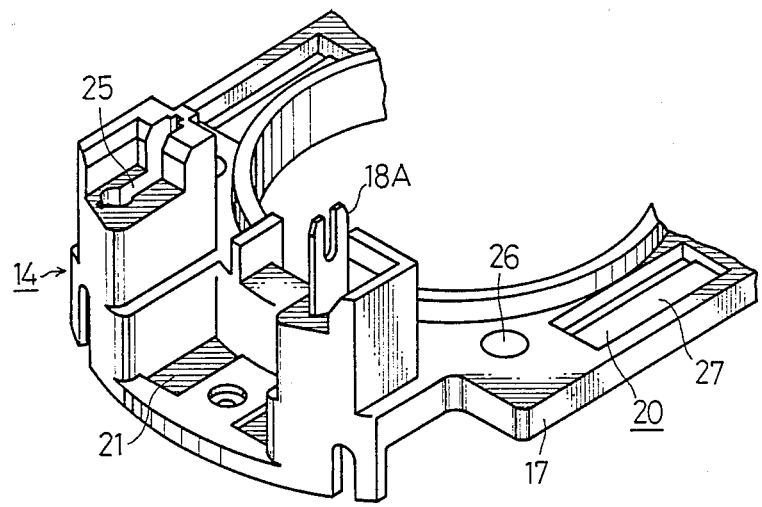
FIG. 4 is a perspective view of the underside of a portion of the brush holder assembly of FIG. 3.
Figure 5:
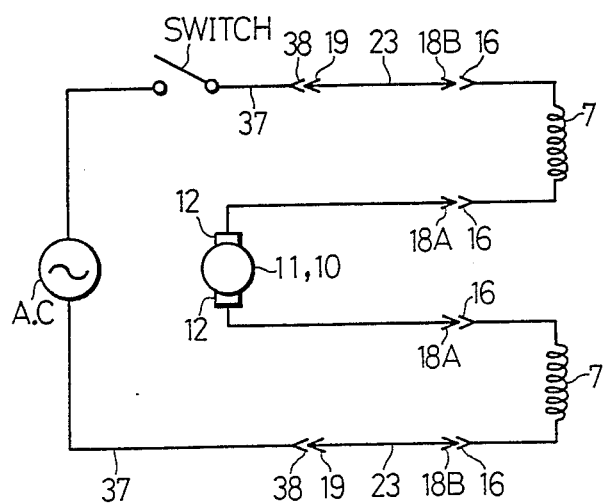
FIG. 5 is a diagram of an electric circuit as employed in the brush holer assembly of FIG. 3.
Figure 7:
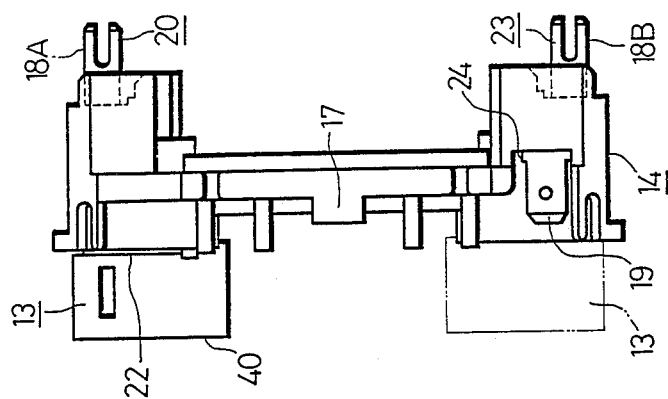
FIG. 7 is a side view of FIG. 6.

Referring first to FIG. 3, the brush holder assembly 14 includes a molded base plate 17 of insulating material having a central aperture for receiving the commutator 11. The brush holders 13 are mounted on one side of the base plate 17 for supporting the brushes 12 in operative relation to the commutator 11. As will be seen in FIGS. 3 to 9, the base plate 17 is provided with two pairs of diametrically opposed male terminals 18A and 18B for plug-in connection with the female terminals 16, and a pair of power terminals 19 for electrically connecting the stator coils 7 to an electrical power source (not shown). The male terminals 18A and 18B, the brush holders 13 and the power terminals 19 are all arranged on the base plate 17 as will be described hereinbelow, according to a predetermined electric circuit shown in FIG. 5.

Figure 10:
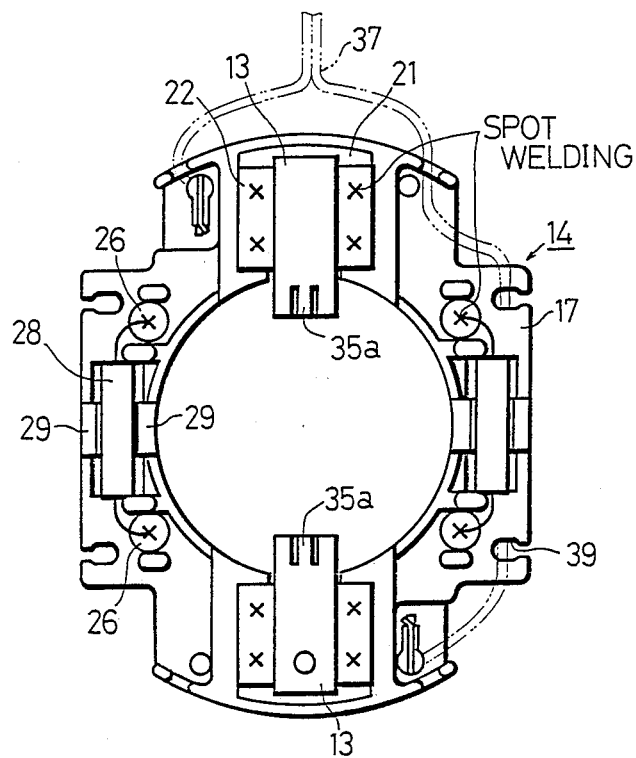
FIG. 10 is a plan view of the brush holder assembly illustrating the electrical connection.
Figure 19:
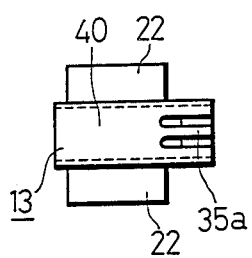
FIG. 19 is a plan view of the brush holder.

As shown in FIGS. 3, 4, 13 and 14, each of the terminals 18A forms a part of a conductive member 20 embedded in the base plate 17. As embodied herein, the conductive member 20 has a brush holder mounting portion 21 which is exposed on both sides of the base plate 17, and the brush holder 13 has two extending legs 22 as shown in FIGS. 3 and 19. Thus, the legs 22 of the brush holder 13 are secured to the brush holder mounting portion 21 of the conductive member 20 by spot welding (FIG. 10). The commutator 11 may change in diameter depending on the type of the electric motor 5, but in this embodiment, such changes can be readily accommodate by changing the position of spot welding without prepring different brush holders.

Figure 16:
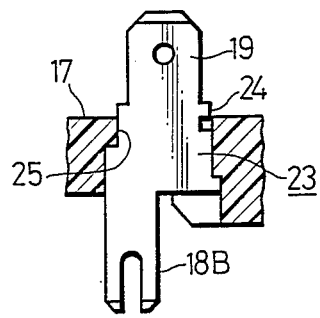
FIG. 16 is a view illustrating the method of mounting the terminal plate on the base plate.
Figure 17:
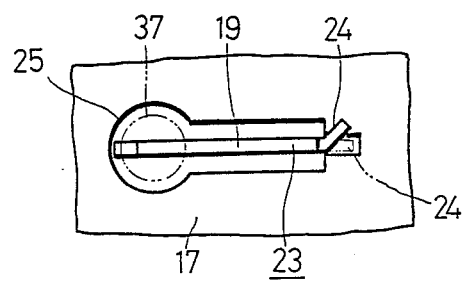
FIG. 17 is an enlarged plan view of FIG. 16.

As shown in FIGS. 3, 16 and 17, each of the male terminals 18B forms a part of a terminal plate 23 which further includes the power terminals 19 at one end. Specifically, the terminal plate 23 has a bendable portion 24 integral with one side edge, and is inserted into a keyhold-shaped through hole 25 formed in the base plate 17. According to the present invention, when the terminal plate 23 is inserted into the through hole 25, the bendable portion 24 is bent, as shown in FIG. 17, to retain the terminal plate 23 on the base plate 17.

Figure 6:
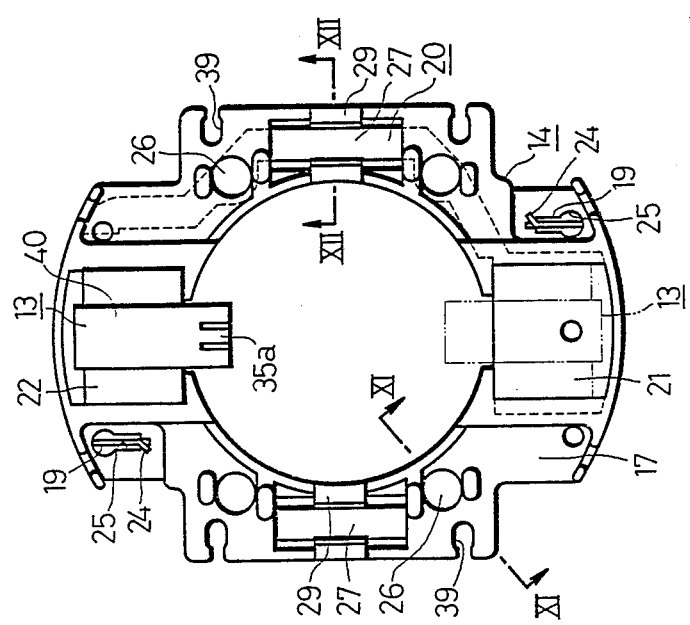
FIG. 6 is a plan view of the brush holder assembly of FIG. 3.
Figure 8:
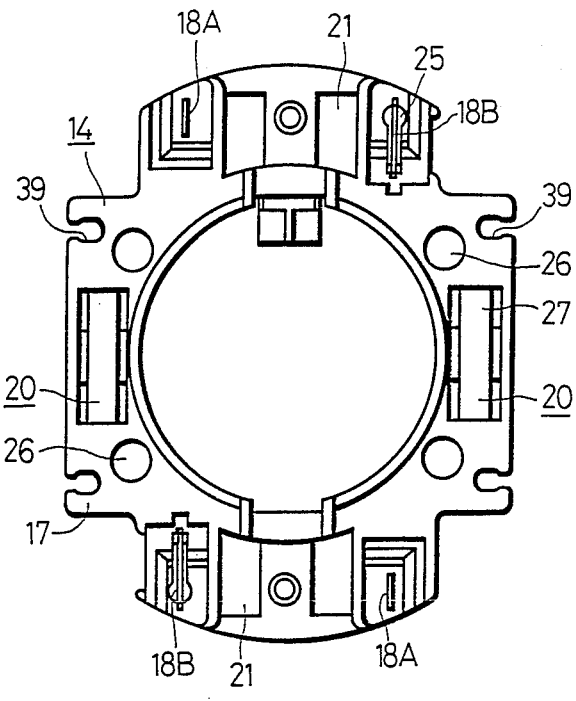
FIG. 8 is an underside view of FIG. 6.
Figure 9:
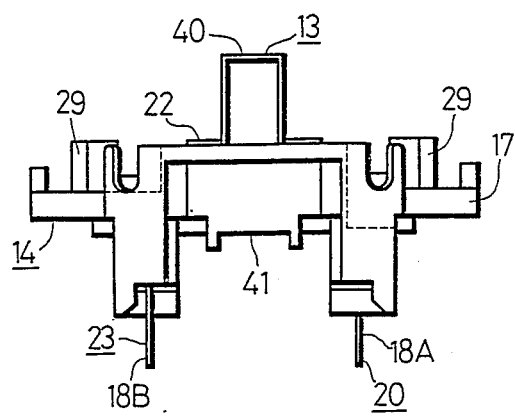
FIG. 9 is an end view of FIG. 6.
Figures 11, 12:
FIG. 11 is a sectional view taken along the line XI—XI of FIG. 6.
FIG. 12 is a sectional view taken along the line XII—XII of FIG.6.
Figure 13:
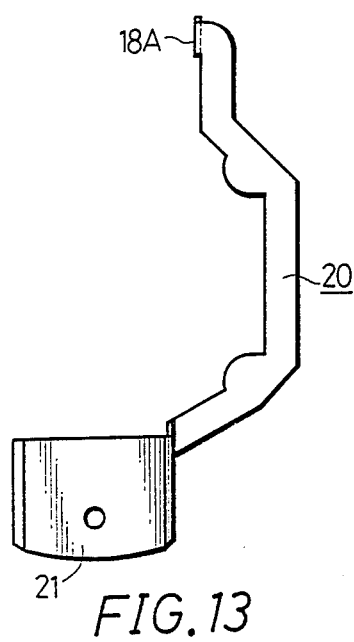
FIG. 13 is a plan view of the conductive member.
Figure 14:
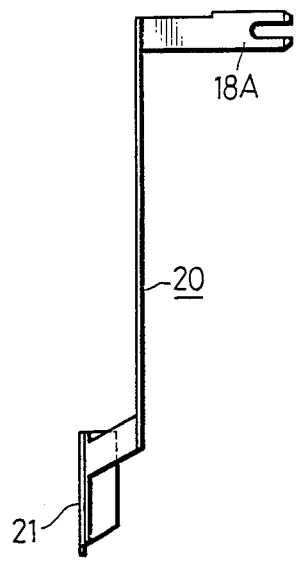
FIG. 14 is a side view of FIG. 13.
Figure 15:
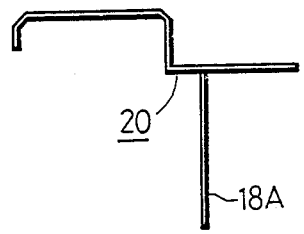
FIG. 15 is an end view of FIG. 13.

The conductive member 20 also has a pair of electrode portions 26 and a rectangular portion 27 exposed on both sides of the base plate 17, as shown in FIGS. 6, 11 and 12. According to an alternate arrangement of the invention, the exposed rectangular portion 27 may be severed, and a noise suppressing choke coil 28 may be connected between the exposed electrode portions 26. To this end, the base plate 17 has a pair of spaced apart projections 29 formed thereon, and as shown in FIG. 10, the noise suppressing choke coil 28 is supported between the projections 29 and is connected through its opposite ends to the respective exposed portion 26 of the conductive member 20 by spot welding.

Figure 18:
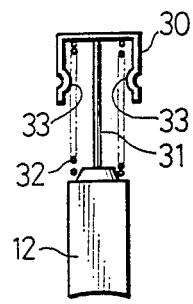
FIG. 18 is a plan view illustrating the method of mounting the brush.
Figure 20:
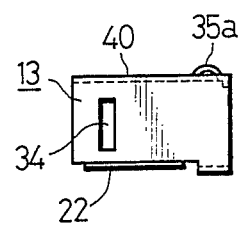
FIG. 20 is a side view of FIG. 19.
Figure 21:
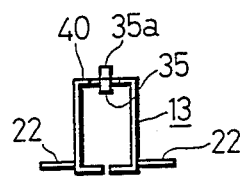
FIG. 21 is an end view of FIG. 19.
Figure 22:
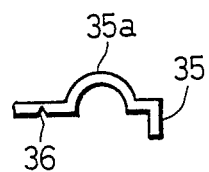
FIG. 22 is a detail view of a portion of the brush holder.

Further details of the brush 12 and the brush holder 13 are seen in FIGS. 3 and 18 to 22 and as seen, the brush 12 is connected to a conductive cap 30 through a pig tail 31 and is urged forwardly by a spring 32. The brush 12 is slidably inserted into the brush holder 13, with the conductive cap 30 mounted on the rear end of the brush holder 13. Specifically, the conductive cap 30 has of locking projections 33 formed inside thereof and adapted to engage holes 34 formed in the rear end of the brush holder 13 (FIGS. 18 and 20). Prior to assembly of the electric motor 5, the brush 12 is restrained from outward movement by a stopper portion 35 formed in the forward end of the brush holder 13 (FIGS. 3 and 21). After the brush holder assembly 14 is connected to the electric motor 5, the stopper portion 35 is bent and cut off at a notch 36 formed as shown in FIG. 22, so that the brush 12 is pressed against the commutator 11. In order to facilitate the bending operation for the stopper portion 35 at the notch 36, the stopper portion 35 is provided with a hook portion 35a projecting upwardly in a curved manner.

A power supply lead 37 may be connected to the power terminal 19 of the terminal plate 23 through an external terminal 38, as shown in FIG. 3, or without using the terminal plate 23, the power supply lead 37 may be inserted into the through hole 25, as shown by a broken line in FIG. 17, and may be directly connected to the female terminal 16. Thus, in this embodiment, the power supply lead 37 may be suitably connected to the stator coils 7 with or without the external terminal 38. As shown in FIG. 10, when interconnection is made, the power supply lead 38 is engaged in cutout portions 39 formed in the periphery of the base plate 17 so that it may be held in place.

The brush holder assembly 14 thus constructed may be stacked stably on another assembly 14 in a horizontal position shown in FIGS. 3 and 6, with the top 40 of the brush holders 13 fitted in U-shaped recesses 41 formed in the underside of the base plate 17. Furthermore, in this stacked condition, all of the terminals 18 and 18B may be kept out of contact with another base plate 17. Thus, the base plates 17 may conveniently be stacked without causing damage to the terminals 18A and 18B, thereby facilitating the assembly of the electric motors 5.

Figure 23:
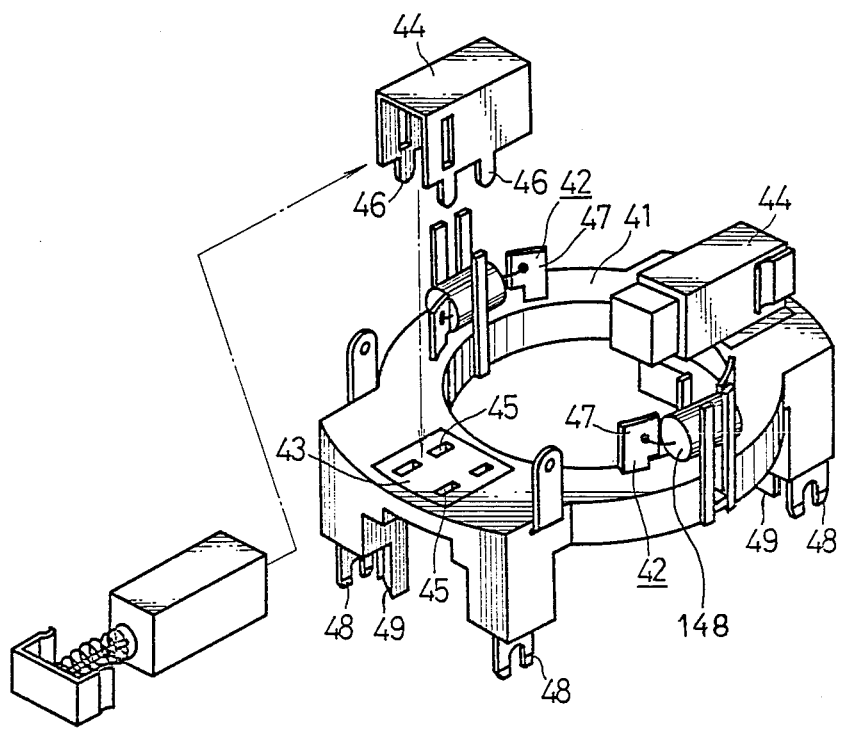
FIG. 23 is a perspective view of a brush holder assembly according to a second embodiment of the present invention.

A second embodiment of the present invention is shown in FIG. 23. According to this embodiment, a conductive member 42 is embedded in an insulting base plate 41 and is provided with a brush holder mounting portion 43 having slits 45. A brush holder 44 has a plurality of tabs 46 projecting therefrom and adapted to be inserted and bent in the slits 45 of the brush holder mounting portion 43 so as to attach the brush holder 44 to the brush holder mounting portion 43. The conductive member 42 is also provided at the medial portion there with an exposed conductive portion 47 projecting outwardly from the insulating base plate 41 and having an intermediate portion out off so as to connect a noise killing choke coil 148 therebetween. Terminals 48 are provided for electrically connecting the power source to the stator coils, and adjacent the terminals 48, guard projections 49 are provided for protecting the terminals 48 during assembly of the electric motor. In other respects, the construction, operation and effect of the second embodiment is substantially the same as those of the first embodiment.

While the invention has been described with reference to preferred embodiments thereof, it is to be understood that modifications or variations may be easily made without departing from the spirit of this invention which is defined by the appended claims.

What is claimed is:

1. A brush holder assembly for a commutator type electric motor including a stator having a pair of stator coils, a terminal mounting board of insulating material disposed on one end of said stator and having a plurality of female terminals connected to said stator coils, a rotor having rotor coils, and a commutator connected to said rotor coils, said brush holder assembly comprising:
- a substantially circular base plate of insulating material having a central aperture for receiving said commutator, said base plate having a pair of through holes formed in opposed relation to the corresponding female terminals of said terminal mounting board, each of said through holes having a circular portion in cross section adapted to receive therein a power supply lead for connection to said female terminal and having a portion extending longitudinally in cross section adapted to received therein a terminal plate for connection to said female terminal, wherein in use either the power supply led or the terminal plate is inserted into said through hole so as to connect said stator coils to an electrical power source;
- a pair of brush holders mounted on said base plate and each slidably supporting a brush in operative relation to said commutator; and
- a pair of conductive members embedded in said base plate, each conductive member having a brush holder mounting portion exposed on one surface of said base plate and connecting terminal for electrical connection to the corresponding female terminal of said terminal mounting board wherein said connecting terminal and said terminal plate are male terminals.

2. The brush holder assembly as defined in claim 1, wherein each of said conductive members has a pair of portions exposed on one surface of said base plate and is severed between said exposed portions, wherein a noise suppressing circuit element is welded at its opposite ends to said exposed portions.

3. The brush holder assembly as defined as claim 1, further comprising a terminal plate retained in each of said through holes, said terminal plate having one end adapted to be connected to the corresponding terminal of said terminal mounting board and the other end adapted to be connected to the terminal of the power supply lead.

4. The brush holder assembly as defined in claim 1 wherein said brush holders are formed of a conductive material and are welded to the corresponding brush holder mounting portions of said conductive members.

5. The brush holder assembly as defined in claim 1 wherein each of said conductive members has a pair of portions exposed on both sides of said base plate and is severed between said exposed portions, and wherein said base plate includes a noise suppressing circuit element welded at its opposite ends to said exposed portions of said conductive member.

6. The brush holder assembly as defined in claim 3 wherein each of said terminal plates has a bendable portion adapted to be bent after insertion of said terminal plate into said through hole so as to retain said terminal plate on said base plate.

* * * * *